United States Patent

Werth et al.

[11] Patent Number: 5,846,634
[45] Date of Patent: Dec. 8, 1998

[54] HEAT SHIELD AND METHOD OF MANUFACTURING THE HEAT SHIELD

[75] Inventors: Albert A. Werth, Evart; John D. Maxson, Midland; James N. Reeves, Clare, all of Mich.

[73] Assignee: Pilot Industries, Inc., Dexter, Mich.

[21] Appl. No.: 811,578

[22] Filed: Mar. 5, 1997

[51] Int. Cl.⁶ .................................. B32B 3/06; B32B 3/24
[52] U.S. Cl. .......................... 428/138; 428/156; 428/133; 428/139; 428/131; 428/457; 428/215
[58] Field of Search ....................... 428/156, 138, 428/133, 139, 131, 457, 215

[56] References Cited

U.S. PATENT DOCUMENTS

| | | | |
|---|---|---|---|
| 3,551,956 | 1/1971 | Rosier | 18/36 |
| 3,869,234 | 3/1975 | Sutch | 425/112 |
| 4,714,575 | 12/1987 | Preston | 264/46.4 |
| 4,940,557 | 7/1990 | Kimura | 264/26 |
| 5,080,949 | 1/1992 | Nawrocki et al. | 428/75 |
| 5,108,687 | 4/1992 | Jourquin et al. | 264/279 |
| 5,190,803 | 3/1993 | Goldbach et al. | 428/138 |
| 5,633,067 | 5/1997 | Illbruck et al. | 428/138 |
| 5,656,353 | 8/1997 | Butler | 428/133 |
| 5,672,405 | 9/1997 | Plank, Jr. et al. | 428/133 |

*Primary Examiner*—William P. Watkins, III
*Attorney, Agent, or Firm*—Gifford, Krass, Groh, Sprinkle, Patmore, Anderson & Citkowski, P.C.

[57] ABSTRACT

A heat shield particularly suited for automotive use is manufactured by placing a metallic foil having a plurality of depressed channels provided about its outer periphery in a compression mold. Each channel, in turn, has a through opening. Thermoset material is then placed into the mold so that, upon mold compression, the thermoset material liquefies and covers one side of the foil and also so that a portion of the material flows through the foil openings so that the channels are embedded in the material to thus mechanically lock the foil and plastic together upon curing.

4 Claims, 1 Drawing Sheet

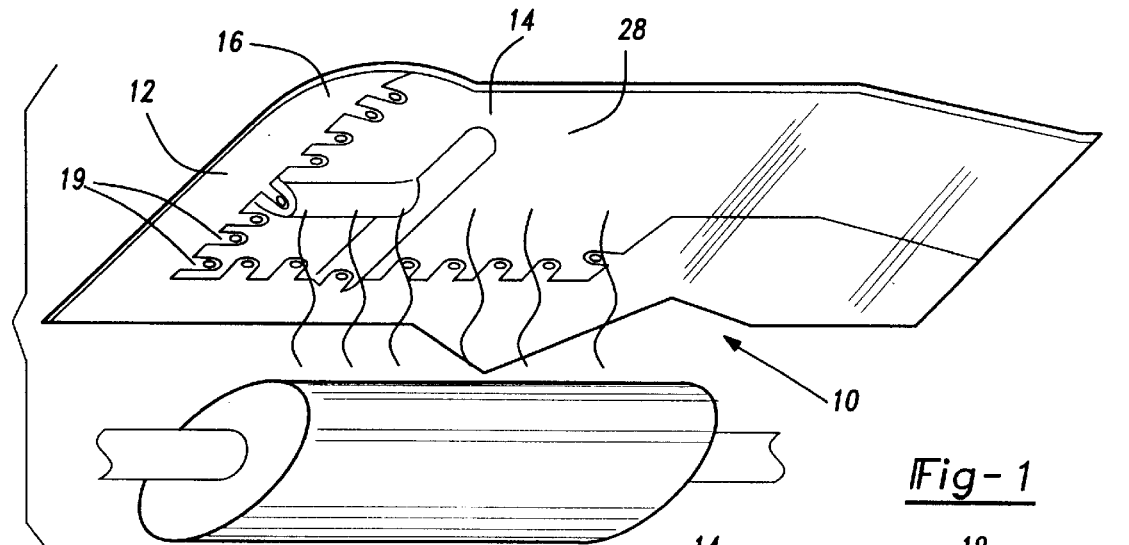
*Fig-1*
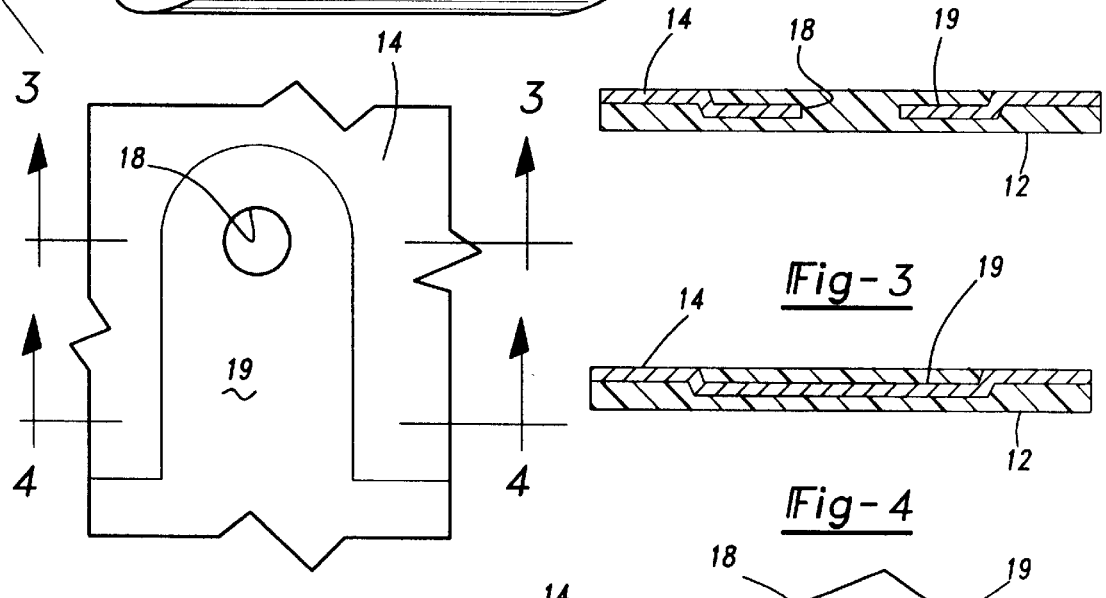
*Fig-2*  *Fig-3*  *Fig-4*
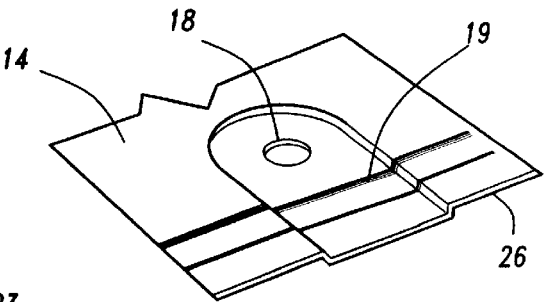
*Fig-5*
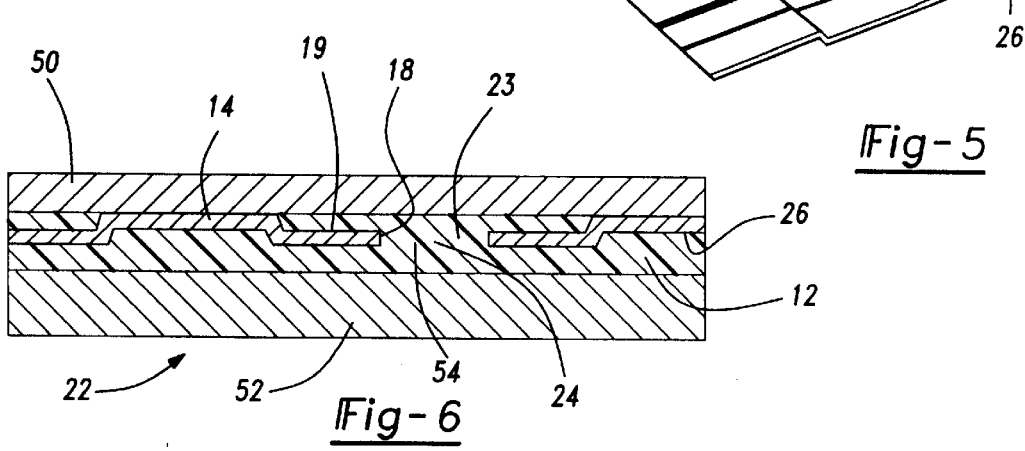
*Fig-6*

HEAT SHIELD AND METHOD OF MANUFACTURING THE HEAT SHIELD

BACKGROUND OF THE INVENTION

I. Field of the Invention

The present invention relates generally to heat shields and, more particularly, to heat shields particularly suited for the automotive industry.

II. Description of the Prior Art

Modern automotive vehicles contain many different components, such as the catalytic converter, muffler and other portions of the exhaust system, which necessarily become quite hot during operation of the vehicle. In many situations, it is necessary to shield other heat sensitive components of the vehicle from the hot components by heat shields. Likewise, it is also necessary to shield the passenger compartment from the hot components of the exhaust system.

There have been a number of previously known heat shields used with automotive vehicles, but these previously known heat shields are relatively expensive to manufacture. Furthermore, the automotive industry is a highly competitive industry so that any reduction in cost for the vehicle, without the sacrifice of performance, is highly advantageous.

SUMMARY OF THE PRESENT INVENTION

The present invention provides a heat shield particularly suited for automotive vehicles which is not only inexpensive to manufacture, but also highly effective in operation.

In brief, in the manufacture of the heat shield of the present invention, a metallic foil, such as aluminum foil, having a plurality of depressed channels formed around its outer periphery. Each channel has a through opening and the foil is placed within a compression mold. The mold is then filled with a thermoset material such that upon mold compression, the thermoset material covers one side of the foil. Simultaneously, a portion of the thermoset material flows through the openings formed through the channels so that, upon hardening of the thermoset material, the material forms a sheet and is mechanically locked to the metallic foil.

In operation, the thermoset material forms the rigidity required for the heat shield while the foil both conducts and reflects heat away from the heat shield in the well known fashion.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is an elevational view of a preferred embodiment of the invention;

FIG. 2 is a plan view illustrating a portion of a preferred embodiment of the invention;

FIG. 3 is a sectional view taken along line 3—3 in FIG. 2 and enlarged for clarity;

FIG. 4 is a sectional view taken along line 4—4 in FIG. 2;

FIG. 5 is an elevational view illustrating a portion of the invention; and

FIG. 6 is a view illustrating a method of the present invention.

DETAILED DESCRIPTION OF A PREFERRED EMBODIMENT OF THE PRESENT INVENTION

With reference to FIGS. 1 and 2, a preferred embodiment of the heat shield 10 of the present invention is there shown and comprises a sheet 12 made of a thermoset material, such as a polymer or plastic. The sheet 12 may be constructed of any conventional thermoset material which is rigid and tough in construction.

The heat shield 10 further comprises a metallic foil 14 which covers at least a portion of one side 16 of the sheet 12. As best shown in FIGS. 1, 2 and 5 the foil 14 includes a plurality of spaced depressed channels 19 (FIG. 3) formed around its outer periphery and an opening 18 is formed through each channel 19.

During the molding process, a portion of the material from the sheet 12 flows through the openings 18 and into the channels 19 in order to embed the channels 19 in the sheet material to mechanically lock the outer periphery of the foil 14 to the sheet 12.

The metallic foil 14 is preferably an aluminum foil and is relatively thick. Ideally, the foil 14 is between 0.01 and 0.02 inches thick and is preferably 0.012 inches thick.

In use, the heat shield 10 is particularly suitable for automotive vehicle applications. The sheet 12 provides the needed rigidity and toughness for the heat shield 10 while the foil 14 reflects heat away from heat sensitive components, e.g. the fuel tank and/or the passenger compartment, in the well known fashion. Additionally, the foil 14 disperses and conducts the heat from the exhaust system components along a broader area of the sheet 12 which is a heat insulator. By so dispersing the heat along the foil 14, the heat is rapidly dissipated by air flow.

With reference now to FIG. 6, the preferred method of manufacturing the heat shield 10 is there shown in which the foil 14 having the channels 19 with the openings 18 around its outer periphery is first placed within a one half 50 of a compression mold 22. In doing so, the foil 14 is positioned against one side 23 of the mold half 50. The remainder of the molding space 24, i.e. the space between mold halves 50 and 52, corresponds to the shape of the sheet 12.

With reference still to FIG. 6, after the foil 14 is positioned within the mold 22, a thermoset material 54 is placed in the mold cavity 24 so that the thermoset material 54 covers one side 26 of the foil 14. Upon mold compression and liquification of the material 24, a portion of the molten thermoset material 54 flows through the openings 18 in the foil channels 19 so that, upon curing, the channels 19 are embedded in the thermoset material. In doing so, the foil 14 and sheet 12 formed from the thermoset material 54 are mechanically locked together. A central portion 28 (FIG. 1) of the foil 14, however, is left in abutment with the outer surface of the sheet 12. The abutment of the sheet 12 with the metallic foil 14 results from the molding pressures in the mold cavity 24.

From the foregoing, it can be seen that the present invention provides a novel heat shield and a method for making the same that is particularly suitable for automotive applications. The heat shield of the present invention can be inexpensively manufactured without sacrifice of operating performance.

Having described my invention, however, many modifications thereto will become apparent to those skilled in the art to which it pertains without deviation from the spirit of the invention as defined by the scope of the appended claims.

We claim:

1. A heat shield comprising:

a sheet having two sides, said sheet being made of a moldable material, a metallic foil disposed over a portion of one side of said sheet, means for mechanically locking an outer periphery of said foil to said sheet, and said mechanical locking means comprising a plurality of channels formed only around an outer periphery of said foil, each channel being depressed such that a plane of each channel is spaced from a plane of a main portion of said metallic foil, each channel having an opening spaced inwardly from an or periphery of its associated channel, and said moldable material from said sheet flowing through said openings during a molding process such that said channels are embedded in said moldable material while one surface of said main portion of said foil overlies said moldable material; and wherein said spaced plane of each channel is substantially U-shaped and has one edge which forms the open portion of the U-shape extending to said outer periphery of said foil.

2. The invention as defined in claim 1 wherein said foil has a thickness of 0.01–0.02 inches.

3. The invention as defined in claim 1 wherein said foil comprises an aluminum foil.

4. The invention as defined in claim 1 wherein said sheet is made of a thermoset material.

* * * * *

UNITED STATES PATENT AND TRADEMARK OFFICE
CERTIFICATE OF CORRECTION

PATENT NO. : 5,846,634

DATED : December 8, 1998

INVENTOR(S) : Albert A. Werth et al.

It is certified that error appears in the above-identified patent and that said Letters Patent is hereby corrected as shown below:

Column 3, claim 1, line 14, before "periphery" delete "or" and insert --outer--.

Signed and Sealed this

Twenty-fifth Day of April, 2000

Attest:

Q. TODD DICKINSON

*Attesting Officer*  *Director of Patents and Trademarks*